United States Patent [19]

Dowd et al.

[11] Patent Number: 4,844,533
[45] Date of Patent: Jul. 4, 1989

[54] FRONT LAMP MODULE AND SUNSHADE SUPPORTS FOR MODULAR HEADLINER

[75] Inventors: James D. Dowd, Farmington Hills; David M. Hilborn, Sterling Heights; Roy Weilant, Clarkston; Abdolhossein R. Lawassani, Pontiac, all of Mich.

[73] Assignee: United Technologies Automotive, Inc., Dearborn, Mich.

[21] Appl. No.: 205,130

[22] Filed: Jun. 10, 1988

[51] Int. Cl.4 .............................................. B60R 11/00
[52] U.S. Cl. ................................ 296/214; 296/37.7; 296/37.8
[58] Field of Search ............... 296/214, 37.7, 37.8, 296/39.1, 39.2

[56] References Cited

U.S. PATENT DOCUMENTS

| | | | |
|---|---|---|---|
| 3,773,378 | 11/1973 | Lewis | 296/37.7 |
| 4,100,372 | 7/1978 | Hypolite | 296/37.7 X |
| 4,101,159 | 7/1978 | Stewart | 296/37.7 |
| 4,188,440 | 2/1980 | Doerer | 296/214 X |
| 4,211,590 | 7/1980 | Steward et al. | 296/214 X |
| 4,241,870 | 12/1980 | Marcus | 296/37.7 |
| 4,352,522 | 10/1982 | Miller | 296/214 |
| 4,610,478 | 9/1986 | Tervol | 296/214 |
| 4,684,164 | 8/1987 | Durham | 296/37.7 |

Primary Examiner—Robert B. Reeves
Assistant Examiner—John M. Gruber

[57] ABSTRACT

A modular headliner subassembly incorporating a substrate defining a first opening, a retainer ring sized to be mounted relative to the first opening, a console sized to fit partially within the opening and be mounted to the retainer ring, a pair of inboard sunshade supports for supporting the inboard end of the sunshades mounted to a modular headliner and retention clips mounted to the inboard sunshade support fastening means such that the substrate and retaining ring are secured between the base of the inboard sunshade support and the retention clip to mount the inboard sunshade support to the substrate prior to assembly of the modular headliner to the motor vehicle.

15 Claims, 3 Drawing Sheets

FRONT LAMP MODULE AND SUNSHADE SUPPORTS FOR MODULAR HEADLINER

CROSS REFERENCE TO RELATED APPLICATIONS

This application relates to the following simultaneously filed patent applications: U.S. Application Ser. No. 07/204,804, for HEADLINER AND SUNSHADE FASTENER by James D. Dowd, David M. Hilborn, Roy Weilant and Abdolhossein, R. Lawassani; U.S. application Ser. No. 07/204,663, for MOTOR VEHICLE BODY STRUCTURE FOR RECEIVING SNAP-FIT MODULAR HEADLINER FASTENERS by James D. Dowd and David M. Hilborn; U.S. application Ser. No. 07/204,662, for ASSIST STRAP FOR A MODULAR HEADLINER by James D. Dowd, David H. Hilborn, Matthew J. Brown and Richard P. Bozyk; U.S. application Ser. No. 07/205/139, for MODULAR HEADLINER ASSEMBLY by James D. Dowd and Darrel Hampton; U.S. application Ser. No. 07/205,257, for SUNSHADE WITH SNAP-FIT FASTENER by James D. Dowd, David M. Hilborn, Roy Weilant and Abdolhossein R. Lawassani; U.S. application Ser. No. 07/204,670, for ASSIST STRAP FOR A MOTOR VEHICLE by James D. Dowd, David M. Hilborn, and Matthew J. Brown; U.S. application Ser. No. 07/205,150, for SUNSHADE FASTENER MODULE FOR USE WITH MODULAR HEADLINER by James D. Dowd, David M. Hilborn, Roy Weilant, and Abdolhossein R. Lawassani; U.S. application Ser. No. 07/205,265, for CONSOLE MOUNTED TO A HEADLINER by David M. Hilborn and Stephen P. McGarry; U.S. application Ser. No. 07/205,131, for MODULAR HEADLINER INCLUDING A WIRE HARNESS by James D. Dowd, Darrel Hampton, and Stephen P. McGarry.

TECHNICAL FIELD

The present invention relates to a modular headliner subassembly for use with a motor vehicle and specifically to a console for mountinq at the front of a modular headliner, inboard sunshade supports mounted to the front of the headliner and a retainer ring sized to engage the substrate adjacent the front of the headliner to provide a mounting for the console and to provide support for the inboard sunshade supports. Also disclosed is a clip for securing the inboard sunshade supports to the retainer prior to assembly of the modular headliner to the motor vehicle body structure.

A modular headliner must provide all the various components necessary for a headliner to be assembled into a unitary structure for mounting into a motor vehicle. This unitary structure must be self-supporting and self-contained and must provide the appropriate structures for the modular headliner to be mounted to the motor vehicle body structure. The various supports and fastening mechanisms must be appropriately oriented in the modular assembly to allow the headliner to be assembled to the body structure.

As described herein, a substrate defines an opening toward the front of a headliner and a retainer ring is sized to be secured relative thereto. A console incorporating features such as lights is mounted to the retainer ring to be secured to the substrate.

On either side of the module are located driver side and passenger side sunshades. Such sunshades are secured to the modular headliner through a primary sunshade support. Each sunshade support is also secured to the headliner through an inboard sunshade support which acts to engage the pivot pin located at the interior end of the sunshade such that the sunshade is firmly affixed above the windshield and may be rotated upwardly and downwardly about an axis of rotation at either end thereof.

It is desirable to have the inboard sunshade support secured to the vehicle body structure such that the forces applied thereto during rotation of the sunshade are transmitted directly to the vehicle body structure. To accomplish this loading the inboard sunshade support has a pair of projecting legs which extend upwardly to engage the vehicle body structure. Said legs extend first, however, through an opening in the substrate and thereafter through an opening in the retainer ring. The retainer ring is appropriately sized such that it has wings extending outwardly from the area containing the light module such that these wings define an opening through which the inboard sunshade support may extend. A retention clip may be mounted to the inboard sunshade support such that the retainer ring and substrate are secured between the base of the inboard sunshade support and the retention clip fastened to the projecting legs to secure the inboard sunshade support in position to be mounted to the motor vehicle body structure prior to the modular headliner being assembled to the motor vehicle. Hence, this retention clip serves to maintain the appropriate component alignment prior to the modular headliner being assembled to the motor vehicle.

The retainer ring and console are appropriately sized such that the console hides the retainer ring from view by an observer in the vehicle. The substrate defining an opening to which the retainer ring is mounted may include a depressed portion defining a downwardly extending area and the opening may be at the bottom of the downwardly extending area such that the substrate itself defines an area in which the console is mounted.

SUMMARY OF THE INVENTION

It is an object of the present invention to provide a retainer ring sized for mounting a console to a substrate.

It is a further object of the present invention to provide a retainer ring sized to distribute loads created by inboard sunshade supports and a console over a large area of the substrate.

It is another object of the present invention to provide a retainer ring including extending wings which engage inboard sunshade supports as well as a console to maintain the positioning of these components and to support these components from the substrate.

It is still another object of the present invention to provide a retention means for maintaining a pair of inboard sunshade supports in the desired position for mounting to the vehicle body structure.

Another object of the present invention is to provide an economical, safe, reliable and easy to use method of forming a portion of a modular headliner.

Other objects will be apparent from the description to follow and the appended claims.

The above objects are achieved according to a preferred embodiment of the invention by the provision of a modular headliner subassembly for use with a motor vehicle having a body structure. The subassembly includes a substrate defining a first opening and a pair of substrate inboard sunshade support openings, said inboard sunshade support openings being positioned on opposite sides and spaced apart from the first opening. Also disclosed is a retainer ring sized to be mounted adjacent the first opening and defining a central cavity, said retainer ring including extending portions to abut against and snap to the substrate about the first opening and wings extending beyond the inboard sunshade support openings, said wings defining wing inboard sunshade support openings in alignment with the substrate inboard sunshade support openings. Additionally, a console is sized to partially fit within the central cavity, said console including means for securing the console to the retainer ring and a trim bezel sized to cover the first opening. A pair of inboard sunshade supports each having a base larger than substrate inboard sunshade support opening and each including a fastening means extending from the base for securing the inboard sunshade support to the body structure of the motor vehicle upon assembly of the headliner to the motor vehicle are also provided. Said fastening means extends through the substrate inboard sunshade support opening and through the retainer ring inboard support opening. Retention clips, one to secure each fastening means to maintain the fastening means in the desired position prior to assembly of the headliner to the motor vehicle are provided. Said retention clips engage the fastening means to secure the substrate and the retainer ring between the inboard sunshade support base and the retention clip.

Further disclosed is a first lamp module and sunshade support for a headliner and a substrate having a modular opening through which a front lamp module may be inserted and a sunshade support opening through which a sunshade support may be mounted, a retainer secured to the substrate about the modular opening and defining a central cavity for the receipt of the lamp module therein, and said retainer having an extending wing defining a wing sunshade support opening. Means are provided for securing a lamp module to a retainer. The sunshade support includes a fastening means extending through the sunshade support opening and the wing sunshade support opening and further includes retention means for securing the sunshade support with the fastening means extending through the sunshade support opening and the wing sunshade support opening.

BRIEF DESCRIPTION OF THE DRAWINGS

FIG. 1A is a perspective view of FIG. 1 taken at the indicated line.

DESCRIPTION OF THE PREFERRED EMBODIMENT

The invention will be described with reference to a specific embodiment or embodiments hereof. It is understood that this invention has applicability with minor modifications to many vehicle lines, body styles, trim levels and structures, and it is to be anticipated that various changes can be made to the disclosed embodiments within the spirit and scope of the invention.

Figure 1:
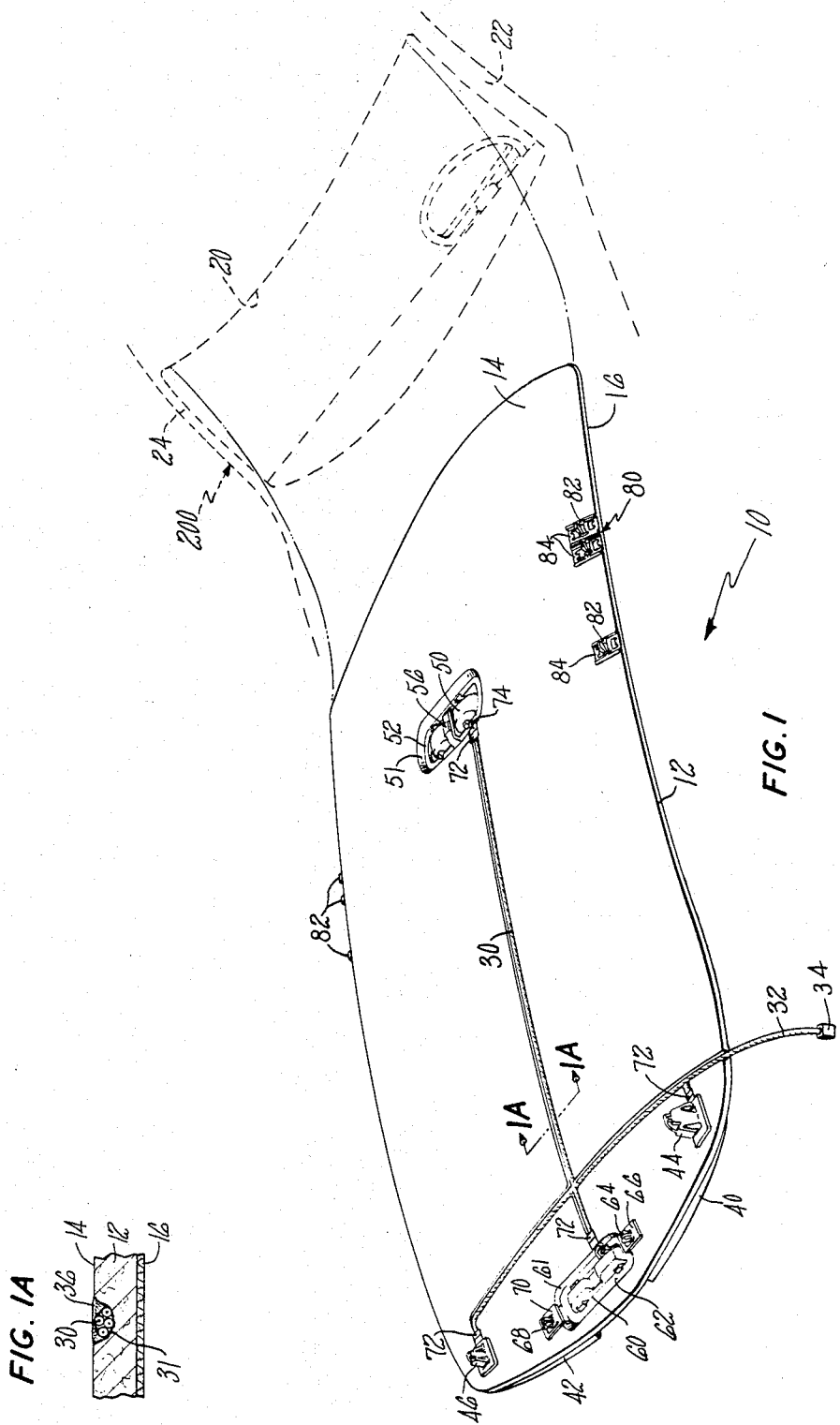
FIG. 1 is a perspective view of a modular headliner assembly positioned adjacent the vehicle windshield opening for assembly therethrough.

FIG. 1 is a perspective view of a modular headliner assembly 10 about to be installed into motor vehicle 200. The motor vehicle is shown having windshield opening 20, left A-pillar 22 and right A-pillar 24 The modular headliner is mounted into the partially assembled vehicle through the windshield or other large window opening which could also be the rear window opening. In this manner, the body structure of the vehicle may be assembled prior to the modular headliner assembly being mounted thereto.

Modular headliner assembly 10 consists of all those components between the decorative interior surface of the headliner and the body structure of the vehicle. The modular headliner 10 must be appropriately configured such that when assembled, the modular headliner may be shipped, handled and installed in the vehicle and potentially mistreated during a portion of this process without having the interior surface damaged, without distortion or bending due to uneven stresses and without impacting the function of the various components thereof.

As may be specifically seen in FIGS. 1 and 1A, the headliner includes substrate 12 made from a material such as molded fiberglass, styrene, cardboard, a polymeric material, or as is otherwise as known in the art. Substrate 12 has mounted on the surface thereof a decorative covering or surface 16 which is the surface visible to an occupant of the finished vehicle. The opposite side of substrate 12 from that on which decorative surface 16 is mounted is the non-show surface, surface 14.

Left sunshade 40 and right sunshade 42 are mounted to the substrate by the use of left sunshade fastener 44 and right sunshade fastener 46.

Additionally shown as part of the modular headliner are assist straps 80 which are retained to the modular headliner by retainers 84 interacting with assist strap legs 82.

Also shown as a portion of modular headliner !0 is center console 50 which is shown secured within depressed portion 51 formed in the substrate to retainer 52. A mesh fastener 56 is shown located to extend upwardly from retainer 52.

Likewise, forward console 60 is shown mounted within depressed portion 61 formed in the headliner in combination with forward retainer 62. Forward retainer 62 includes an outwardly projecting area through which left inboard sunshade support 64 and right inboard sunshade support 68 extend. Appropriate retainers 66 and 70 are shown for securing the legs of the inboard sunshade supports to hold the inboard sunshade supports in position.

Further shown as part of the modular headliner is wire harness 30 having a wire bundle 32, including a vehicle electrical connector 34 and a series of accessory connectors 72 located adjacent each accessory requiring electrical connections. Complementary connectors 74 extend from each accessory and mate with accessory connectors 72 to form a completed wire harness. Vehicle electrical connector 34 is typically connected to a mating connection extending from the vehicle body electrical system in an easy to access area such as one of the A-pillars.

Additionally it may be seen that the modular headliner wire harness is secured within substrate channels 31 such that the wire is maintained therein. Additionally, adhesive 36 may be placed over the wire bundle to secure the wire bundle within the channel. In this manner, the wires are protected from inadvertent contact with roof bows or other roof structure and the potential for damage to the wires is avoided.

As may be seen in FIG. 1, the modular headliner assembly is about to be inserted into the vehicle for assembly thereto. The left and right sunshade fasteners, 44 and 46, extend upwardly and include legs for engaging with the metal structure of the vehicle to mount the same thereto. Likewise, assist straps 80 have upwardly extending legs 82 which engage appropriate openings in the body structure to also secure the modular headliner to the vehicle. Furthermore, mesh fastener 56 may appropriately interact with a corresponding mesh fastener to likewise secure the headliner to the body structure. Hence, the left and right sunshade fasteners and at least one of the two assist strap handles are used for securing the modular headliner assembly to the motor vehicle. Furthermore, the mesh fastener of retainer 52 may likewise serve such a function. Also not to be ignored are the right inboard sunshade support and the left inboard sunshade support which also includes legs for engaging the sheet metal structure of the vehicle.

In order to assemble the modular headliner to the vehicle, the headliner is slid through a large window opening such as a windshield and placed in general position to which it is to be mounted. An operator then positions one of the sunshade fasteners to feel when the fastener mates with an appropriate opening. The sunshade fastener is then snap-fit into the opening to mount that portion of the modular headliner. The same process is then followed with the other sunshade fastener, the assist straps and the inboard sunshade supports. In this manner, the entire modular headliner may be snap-fit to the motor vehicle. Thereafter, an appropriate electrical connection is made at vehicle electrical connector 34 and the assembly process for the headliner is complete.

Figure 2:
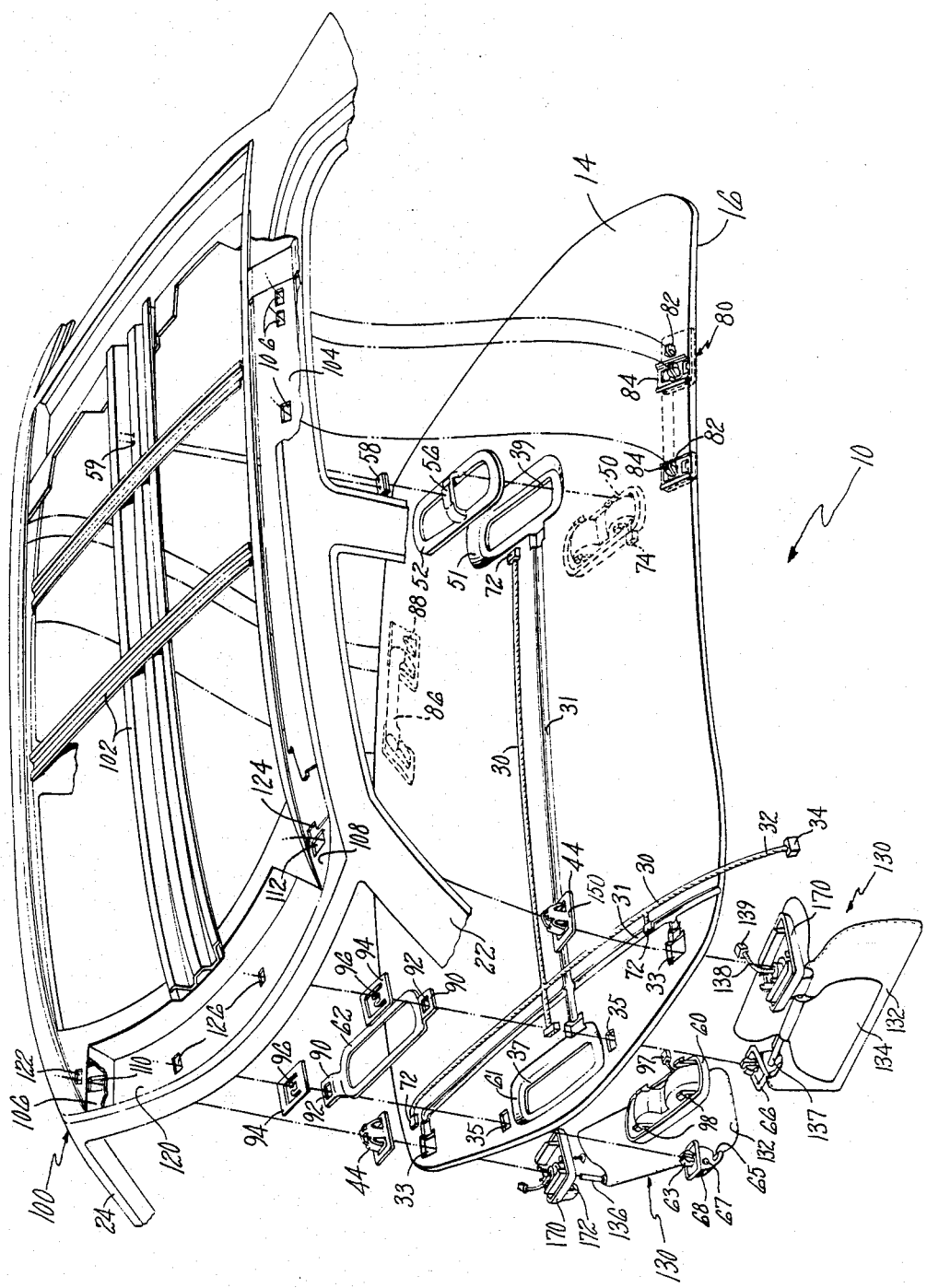
FIG. 2 is an exploded perspective view of a modular headliner assembly and appropriate portions of the vehicle body structure.

In FIG. 2 an exploded view of a modular headliner about to be mounted to a vehicle body structure is shown. In this view it may be seen that modular headliner 10 incorporates many various subassemblies such that all the appropriate subassemblies are mounted to the modular headliner and such that may be readily fastened to the vehicle body structure.

The wire harness 30 of the modular headliner assembly includes a series of accessory connectors 72 adapted to be connected to the appropriate electrical accessory mounted to the headliner. The wire harness assembly is further shown slightly exploded from channels 31 formed in the substrate for securing the headliner wire harness therein. This wire harness assembly is shown somewhat schematically and may, in fact, be located at different positions about the headliner, such positions being chosen for having optimum room for securing wires therein and for providing optimum space between the headliner and the vehicle body structure to prevent any accidental contact therebetween.

The center console 50 is shown having a complementary connector 74 extending therefrom for connection to accessory connector 72. Front console 60 has a complementary connector 97 and sunshade module 130 has a complementary connector 139, designed to be connected to accessory connectors 72 to form the integrated wire harness of the modular headliner assembly.

Center console 50 and forward console 60 are shown somewhat in schematic format. It is to be understood that these consoles may include features such as overhead lights, reading lights, displays, vanity mirrors, garage door opener compartments switches, and other control features such that a modular headliner wire harness may include a significant number of conductors. Additionally, the sunshade modules as shown are anticipated to be sunshade modules incorporating illuminated vanity mirrors which likewise require a power supply.

Center console 50 is mounted through a substrate center module opening 39 formed in depressed portion of the substrate 51 to retainer 52 mounted on the opposite side of the substrate. Retainer 52 may have extending wings which act to distribute the load of the console over a wide area of the substrate such that uneven loading or distortion during the shipping or handling process is avoided. The substrate about the console is depressed and defines an opening therein. The console covers the end of the depression including the opening to form a neat, highly attractive module.

Mesh fastener 56 attached to a back portion of the retainer or alternatively to the console is designed to interact with mesh fastener 58 secured at location 59 to the roof bows of the vehicle body structure. This mesh retainer is preferably a Dual Lock ® retainer. By the selection of Dual Lock material, it is possible that the headliner may slide into position with one portion of the Dual Lock fastener sliding relative to the other. The Dual Lock fastener has the property that it does not grab and lock until the two fasteners are forced one into the other such as when the substrate is displaced upwardly locking it into its final position. Prior to such time, the headliner and the two mesh portions may be slid relative to one another to allow positioning and alignment of the headliner. This is quite different than other mesh fasteners which grab upon contact and may not thereafter be readily displaced.

Front console 60 is shown having snap legs 98 which extend upwardly through substrate front console opening 37 formed in depressed portion 61 to engage retainer 62. Retainer 62 has wings 90 which define wing openings 92. Inboard sunshade supports 66 and 68 extend with fastening legs 63 projecting upwardly through substrate openings 35, through retainer openings 92 and are secured in position by retainers 94 including spring legs 96 and, upon final assembly, extend through header openings 126 in the vehicle body structure. Each of the inboard sunshade supports 66 and 68 includes a receptacle for secondary visor 67 and a slot for receiving primary visor 65. As is seen in reference to sunshade module 130, the module includes a primary visor 132 and a secondary visor 134. The primary visor is mounted on the pivot rod 136 and the secondary visor is mounted on the pivot rod 137. The sunshade module further includes fastener 44 having a base 170, cover 150 and wires 138 extending therebetween. The primary visor is mounted for pivoted movement with pivot rod 136 and for rotation about the pivot rod 136 between a stored position against the headliner and a downward position to shield an occupant's eyes from sunlight entering through the windshield. When the primary visor is pivoted to block the sunlight coming through the side window, then the secondary visor may be rotated downwardly to block sunlight entering in through the windshield.

Assist straps 80 include projecting legs 84 projecting through the headliner substrate. Retainers 82 are shown in engagement with legs 84 to secure the assist straps to the headliner. An assist strap may include handle 86 and a coat hook 88, and is mounted in an appropriate position to provide a grab handle for an occupant entering or leaving the vehicle. Assist strap openings 106 are shown defined by inside rail 104 of the vehicle body structure 100. It is to these assist strap openings 106 that legs 82 engage to hold the assist strap and consequently the modular headliner in position. Fastener 44 engages the vehicle body structure through left A-pillar opening 112 formed in left A-pillar inner 108, a portion of A-pillar 22. In the same manner, right fastener 44 is inserted through the right A-pillar opening 110 of right A-pillar inner 106, a portion of right A-pillar 24. Both fasteners are likewise mounted through header left sunshade fastener 124 and header right sunshade fastener 122 openings, both being openings in header 120.

Vehicle body structure 100 as shown includes a series of roof bows 102 and the header and A-pillars as previously mentioned. Additionally, vehicle body structure 100 includes side rail 104 defining openings 106 to which the various assist strap legs may be engaged.

Hence, it may be seen from FIG. 2 that the entire modular headliner assembly may be secured to the vehicle body structure with the vehicle body structure merely providing appropriately sized and positioned openings. No other structure need be added to the vehicle body structure to allow the modular headliner to be secured thereto. All the fasteners for securing the modular headliner are affixed to the modular headliner such that the vehicle assembler need only mount the modular headliner to the vehicle body structure and need not add any intermediate fastener or receptacle portions to due such.

Figure 3:
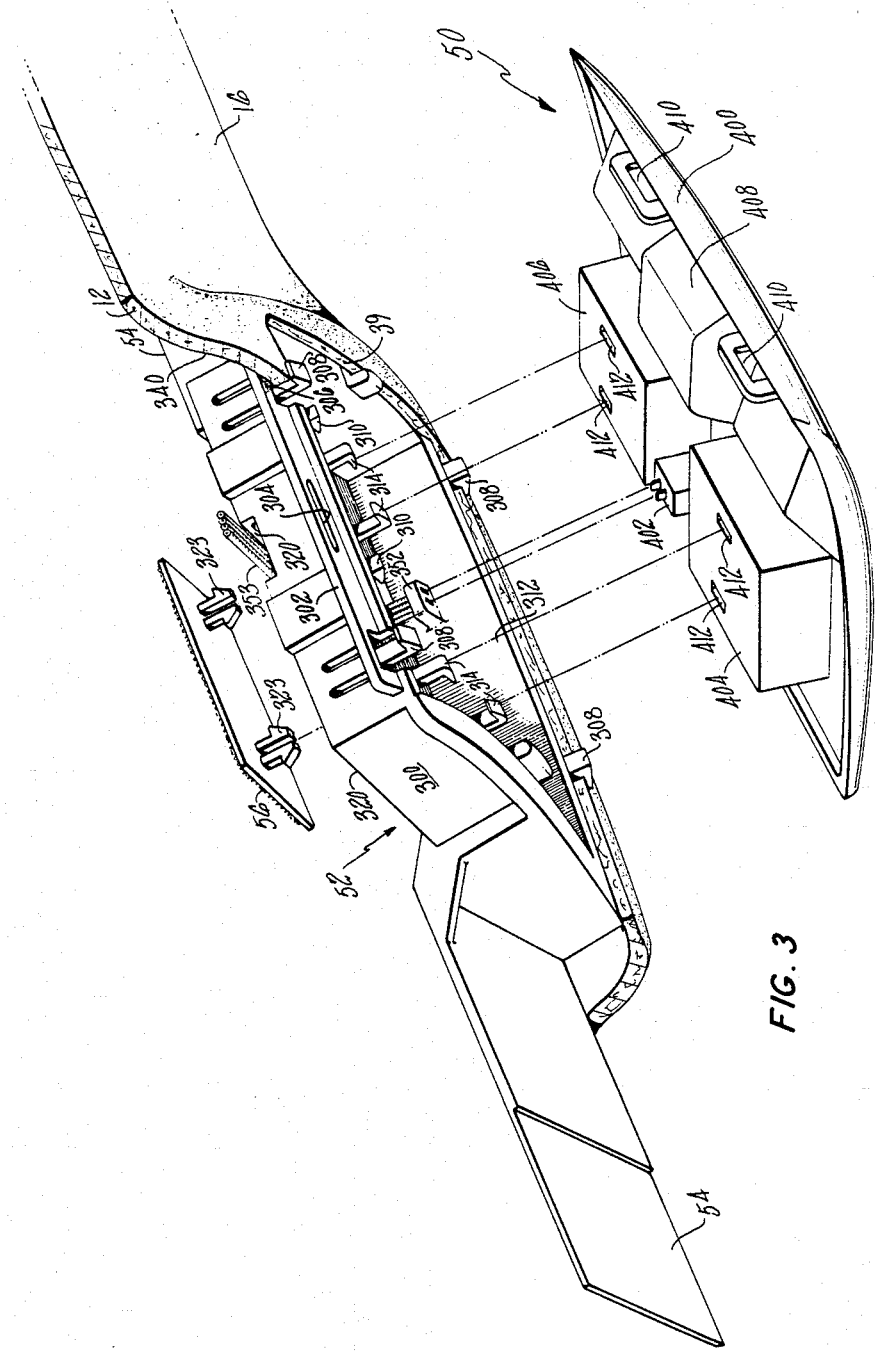
FIG. 3 is an exploded, perspective view of a console mounted to a retainer.

FIG. 3 is an exploded, perspective view of retainer 52 and console 50 shown as a portion of the modular headliner. Retainer 52 is shown having walls 300 extending in a generally vertical direction, having flexible fingers 310 extending inwardly therefrom and shelf 302 extending outwardly therefrom. Additionally, latching finger 308, extend below and outwardly from wall 300. The retainer defines a central cavity 312 into which console 50 may be mounted, the console containing the selected accessories for the chosen headliner. Console 50 includes trim bezel 400, lamp housings 404 and 406 wherein lamps may be mounted, electrical connector 402, catch 410, slots 412 formed in the lamp housing and switch housing 408 wherein any number of switches or similar components may be mounted.

The retainer may additionally include a back panel 320 (not directly shown) to which a Dual Lock ® fastener 56 having a pair of snap fasteners 323 may be secured. These fasteners may be snap-fit into an opening in back panel 320 (not shown) using snap fasteners 323 to which the Dual Lock is secured. Electrical connector 352 may also be a portion of the retainer such that assembly of the console to the retainer acts to electrically engage connector 402 mounted to the console to connector 352 mounted to the retainer. Wires 353 are shown extending from connector 352 to the headliner wire harness.

Shelf 302 is mounted to the retainer and may define shelf openings 304 therein through which or adjacent to which adhesive 306 is applied to additionally secure the retainer to the substrate. Latching fingers 308 are provided such that upon assembly of the retainer to the substrate through substrate opening 39, the shelf will sit on top of the substrate and the latching finger will engage the bottom of the substrate to sandwich the substrate therebetween to lock the retainer in position.

The substrate is originally formed or molded to create a depressed portion 340 to which the retainer and console are mounted. It is within this depressed portion that substrate opening 39 is formed. Shelf 302 sits on the substrate within the depressed portion. As may be seen in FIG. 1, the nondepressed portion of the substrate is substantially the same height as of the top of the retainer. In this manner, retainer wings 54 which may extend outwardly from the retainer, may act to engage the top of the nondepressed portions of the substrate. The retainer wings are of significant area such that the load or weight from the console and retainer may be distributed over wide areas of the substrate. This weight distribution acts to prevent the modular headliner from being distorted during the assembly and shipping process due to the weight of the console and retainer.

Flexible fingers 310 extends inwardly and may coact with catches 410 of console 50 or console 50 may additionally have mounting means such that as console 50 is snap-fit into the retainer, the two are secured together. Housing fingers 314 extend downwardly from retainer 52 within cavity 312 and are positioned to engaged slots 412 of lamp housings 404 and 406 to further secure the console to the retainer. Trim bezel 400 is shown as a part of console 50 and extends to cover latching fingers 308 and substrate openings 39 such that the trim bezel mates with the depressed portion o the substrate at the decorative surface to provide a quality looking console mounted to the headliner. The latching fingers should not be observable to the vehicle occupant after assembly.

The invention has been described with reference to a particular embodiment. It is to be understood by those skilled in the art that variations and modifications can be made within the spirit and scope of the invention.

We claim:

1. A modular headliner subassembly for use with a motor vehicle having a body structure which comprises:

a substrate defining a first opening and a pair of substrate inboard sunshade support openings, said inboard sunshade support openings being positioned on opposite sides and spaced apart from said first opening;

a retainer ring sized to be mounted adjacent the first opening and defining a central cavity, said retainer ring including extending portions to abut against the substrate about the first opening and wings extending beyond the inboard sunshade support openings, said wings defining wing inboard sunshade support openings in alignment with the substrate inboard sunshade support openings;

a console sized to partially fit within the central cavity, said console including means to promote fastening to the retainer ring to secure the console to the retainer ring and a trim bezel sized to cover the first opening;

a pair of inboard sunshade supports each having a base larger than the substrate inboard sunshade support opening and each including fastening means extending from the base for securing the inboard sunshade support to the body structure of the motor vehicle upon assembly of the headliner to the motor vehicle, said fastening means extending through the substrate inboard sunshade support opening and through the retainer ring inboard support opening; and retention clips, one to secure each fastening means to maintain the fastening means in the desired position prior to assembly of the headliner to the motor vehicle, said retention clips engaging the fastening means to secure the substrate and the retainer ring between the inboard sunshade support base and the retention clip.

2. The apparatus as set forth in claim 1 wherein the retainer ring further comprises latching fingers extending through the first opening, said latching fingers engaging the substrate on the opposite side that the extending portions engage the substrate to sandwich the substrate therebetween to engage the retainer ring to the substrate.

3. The apparatus as set forth in claim 2 wherein the substrate defines a depressed portion and wherein the first opening is defined by the depressed portion and wherein the retainer ring extending portions engage the substrate adjacent the first opening and within the depressed portion.

4. The apparatus as set forth in claim 3 wherein the retainer ring wings extend to abut against the substrate adjacent the substrate inboard sunshade support openings at a portion of the substrate other than the depressed portion.

5. The apparatus as set forth in claim 1 wherein the retainer ring further comprises means to secure the console to the retainer ring.

6. The apparatus as set forth in claim 1 wherein the retention clip further comprises a planar clip including a pair of projecting spring-like fingers, said fingers being located one on either side of the fastening means for securing the retention clip to the fastening means.

7. The apparatus as set forth in claim 1 wherein the console further comprises:
   a pair of lamp means, switches for operating each lamp means and a lens associated with each lamp means.

8. The apparatus as set forth in claim 1 wherein the console further comprises:
   display means for indicating the condition of selected components of the motor vehicle.

9. The apparatus as set forth in claim 1 wherein the retainer ring is sufficiently sized to distribute the weight of the console and inboard sunshade supports over a large enough portion of the substrate to prevent damage to the substrate prior to assembly of the headliner to the motor vehicle.

10. A front lamp module and sunshade support for a headliner which comprises:
    a substrate having a module opening through which a front lamp module may be inserted and a sunshade support opening through which a sunshade support may be mounted;
    a retainer secured to the substrate about the module opening and defining a central cavity for the receipt of the lamp module therein, said retainer having an extending wing defining a wing sunshade support opening;
    means for securing the lamp module to the retainer; and
    wherein the sunshade support includes fastening means extending through the sunshade support opening and the wing sunshade support opening and further comprising retention means for securing the sunshade support with the fastening means extending through the sunshade support opening and the wing sunshade support opening.

11. The apparatus as set forth in claim 10 wherein the substrate includes a depressed portion and wherein the module opening is defined in the depressed position and wherein the retainer is secured to the substrate about the depressed portion, but the retainer wings abut the substrate at a portion other than the depressed portion.

12. The apparatus as set forth in claim 10 wherein the lamp module further comprises lamp means for illuminating the vehicle interior.

13. The apparatus as set forth in claim 12 wherein the lamp module further comprises a display.

14. The apparatus as set forth in claim 12 wherein the lamp module further comprises a storage compartment.

15. The apparatus as set forth in claim 12 wherein the lamp module further comprises a garage door opener compartment.

* * * * *